United States Patent
Cohn

(10) Patent No.: US 9,588,355 B2
(45) Date of Patent: Mar. 7, 2017

(54) PAIR OF GLASSES WITH SECONDARY LENSES

(71) Applicant: Steven Cohn, Drexel Hill, PA (US)

(72) Inventor: Steven Cohn, Drexel Hill, PA (US)

( * ) Notice: Subject to any disclaimer, the term of this patent is extended or adjusted under 35 U.S.C. 154(b) by 20 days.

(21) Appl. No.: 14/604,474

(22) Filed: Jan. 23, 2015

(65) Prior Publication Data

US 2015/0219930 A1   Aug. 6, 2015

Related U.S. Application Data

(60) Provisional application No. 61/934,482, filed on Jan. 31, 2014.

(51) Int. Cl.
| | |
|---|---|
| *G02C 5/22* | (2006.01) |
| *G02C 5/00* | (2006.01) |
| *G02C 7/08* | (2006.01) |
| *G02C 9/02* | (2006.01) |

(52) U.S. Cl.
CPC ............ *G02C 5/2263* (2013.01); *G02C 5/00* (2013.01); *G02C 5/22* (2013.01); *G02C 5/2209* (2013.01); *G02C 7/086* (2013.01); *G02C 9/02* (2013.01)

(58) Field of Classification Search
CPC .......... G02C 5/00; G02C 5/22; G02C 5/2209; G02C 5/2263; G02C 7/08; G02C 7/086; G02C 9/02
USPC .................................................... 351/57, 59
See application file for complete search history.

(56) References Cited

U.S. PATENT DOCUMENTS

| | | | | |
|---|---|---|---|---|
| 4,822,158 A | * | 4/1989 | Porsche | G02C 1/04 351/124 |
| 4,974,954 A | * | 12/1990 | Muller | G02C 9/02 351/50 |
| 5,373,331 A | * | 12/1994 | Vallalla | G02C 1/08 351/156 |
| 5,694,193 A | * | 12/1997 | Murphy | G02B 7/002 351/158 |
| 5,971,536 A | * | 10/1999 | Chiu | G02C 1/06 351/108 |
| 6,086,199 A | * | 7/2000 | Holland | G02C 1/06 351/41 |
| 6,712,465 B1 | * | 3/2004 | Teng | G02C 9/00 351/47 |
| 8,408,695 B2 | * | 4/2013 | Calilung | G02C 1/06 351/137 |
| 2005/0128427 A1 | * | 6/2005 | Hwang | G02C 7/086 351/57 |

(Continued)

*Primary Examiner* — Bumsuk Won
*Assistant Examiner* — William R Alexander

(57) ABSTRACT

A construction for eyeglasses provides a frame with a first rim for securing a first fixed lens, a second rim for securing a second fixed lens, a first temple hinge for pivotally joining a first temple arm to the first rim, a second temple hinge for pivotally joining a second temple arm to the second rim, and a pair of double-knuckle hinges for joining pivotally joining a first selectable lens and a second selectable lens to the frame. The double knuckle hinges allow the first selectable lens and the second selectable lens to rotate 270 degrees, switching between a storage configuration and an active configuration. In the active configuration the selectable lenses overlap the fixed lenses in order to provide additional desirable properties. Thus the selectable lenses can be used in combination with the fixed lenses to act as bifocal glasses.

20 Claims, 12 Drawing Sheets

(56) References Cited

U.S. PATENT DOCUMENTS

2009/0122254 A1\* 5/2009 Van Der Heijde .... G02C 7/081
351/57
2013/0250230 A1\* 9/2013 Huynh ................... G02C 3/003
351/59

\* cited by examiner

PAIR OF GLASSES WITH SECONDARY LENSES

The current application claims a priority to the U.S. Provisional Patent application Ser. No. 61/934,482 filed on Jan. 31, 2014.

FIELD OF THE INVENTION

The present invention relates generally to eyeglasses. More specifically, the present invention is an alternative construction for eyeglasses which allows for the consolidation of multiple lenses onto a single pair of eyeglasses.

BACKGROUND OF THE INVENTION

The human body is not perfect and is riddled with various shortcomings, one being visual impairment. Whether due to disease, trauma, congenital or degenerative conditions the human eye is a very sensitive organ susceptive to damage and diseases which may result disruption of vision. Three of the most prominent visual impairment conditions are myopia, hyperopia, and presbyopia. Myopia, also known as nearsightedness, occurs when the image being observed from afar does not focus directly on the retina, the light sensitive tissue which lines the inner surface of the eye, but in front of it. As a result, the image being observed is perceived blurry and out of focus. For myopia, this is the case for objects seen at a distance; closer objects do not experience a distorted visual manifestation. Hyperopia, on the other hand, is the condition where objects observed from a close distance seem blurry and out of focus. Also known as farsightedness, this condition is the result of the image focusing behind the retina of the eye; this is caused by an imperfection in the eyeball shape, it is too short. Objects observed from a distance are unaffected by this condition. Another prominent visual impairment condition which plagues the human body is presbyopia; loosing the ability to focus on close objects as natural course of aging. This condition is mostly seen after the age of forty. At this point separate prescriptions are needed for the purpose of viewing objects at various distances.

One of the most popular solutions to the conditions listed above is corrective lenses. Corrective lenses are worn a short distance from the eye and refract the light before it enters the eye such that the image focuses directly on the retina; correcting innate refractive errors. Myopia and hyperopia require different type of lenses; nearsightedness requires divergent lenses and far-sightedness requires convergent lenses. Corrective lenses in the form of glasses first came to fruition in Italy around 1286. Ever since then, eyeglass designs and configurations have evolved to better accommodate the various conditions which plague the human eye. A few particular cases which to this day eludes a concrete solution is when presbyopia occurs in conjunction with common hyperopia, myopia, or astigmatism. In some cases presbyopia begins to develop in eyes already affected by other visual impairing conditions, such as hyperopia, myopia, and astigmatism. As a result the person requires two different prescriptions. Bifocal lenses do exist, and do help with the visual impairment but they require the user to tilt their head at various angles depending on what they are looking at, and can be a tedious and uncomfortable consequence the design.

The present invention seeks to solve this dilemma through the addition of two more lenses which, when used in conjunction with the fixed lenses, provide the user with the option to view focused images up close or at a distance. Furthermore, the additional lenses could be used as sunglasses or in an aesthetic and decorative means.

DETAIL DESCRIPTIONS OF THE INVENTION

Figure 1:
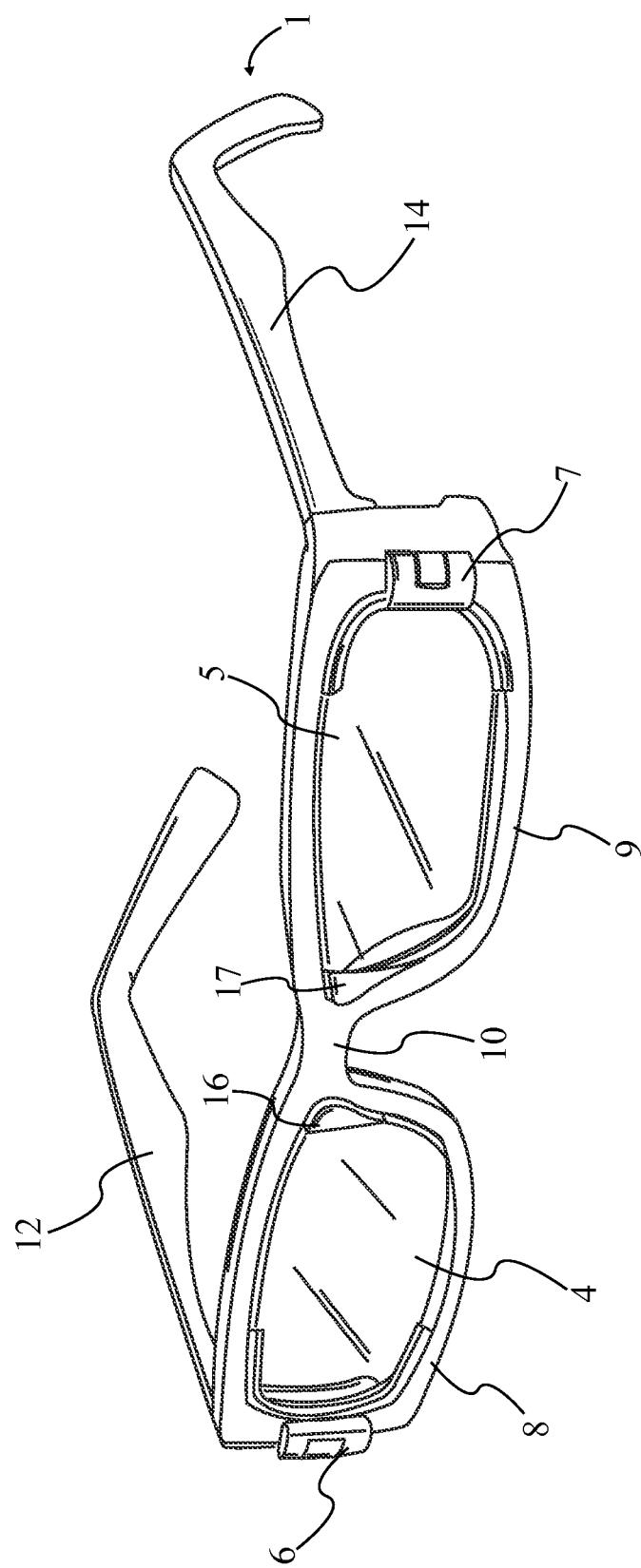
FIG. 1 is a perspective view of a first embodiment of the present invention in an active configuration.
Figure 2:
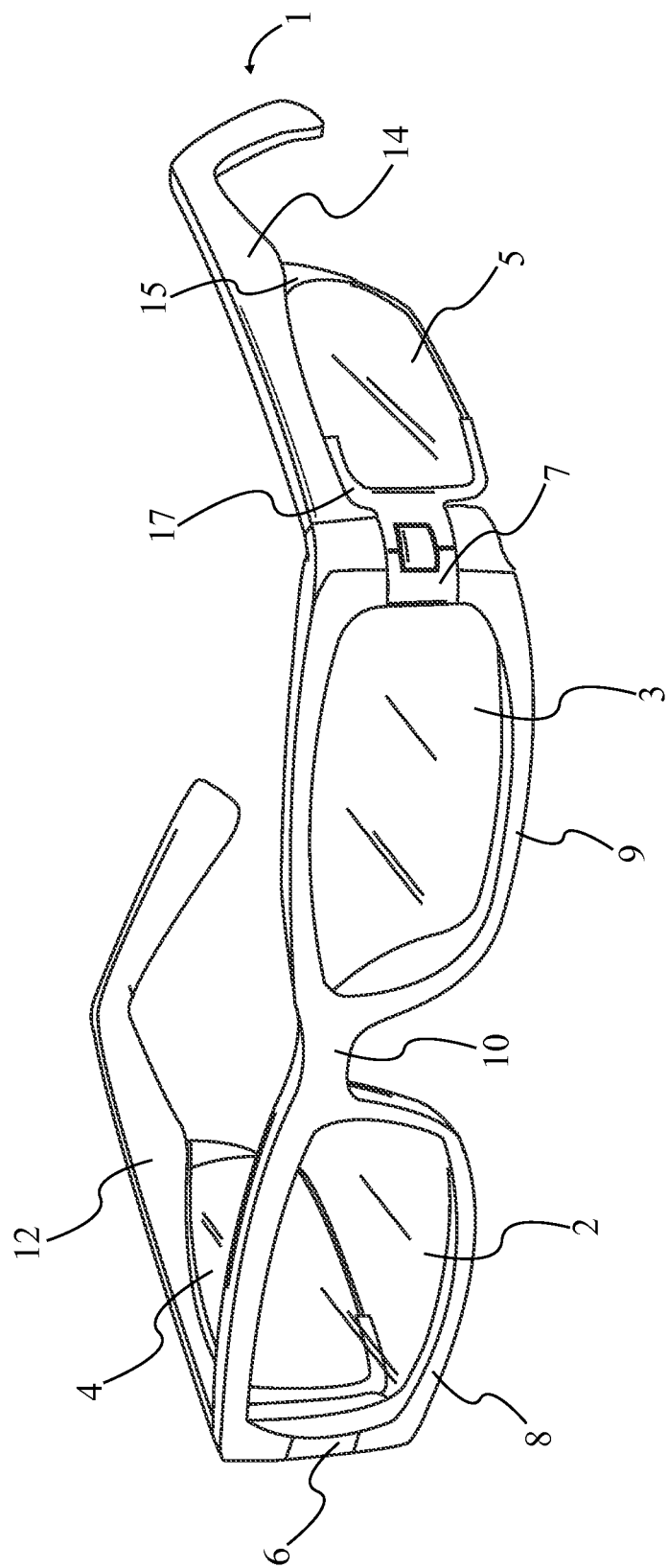
FIG. 2 is a perspective view of a first embodiment of the present invention in a storage configuration.
Figure 3:
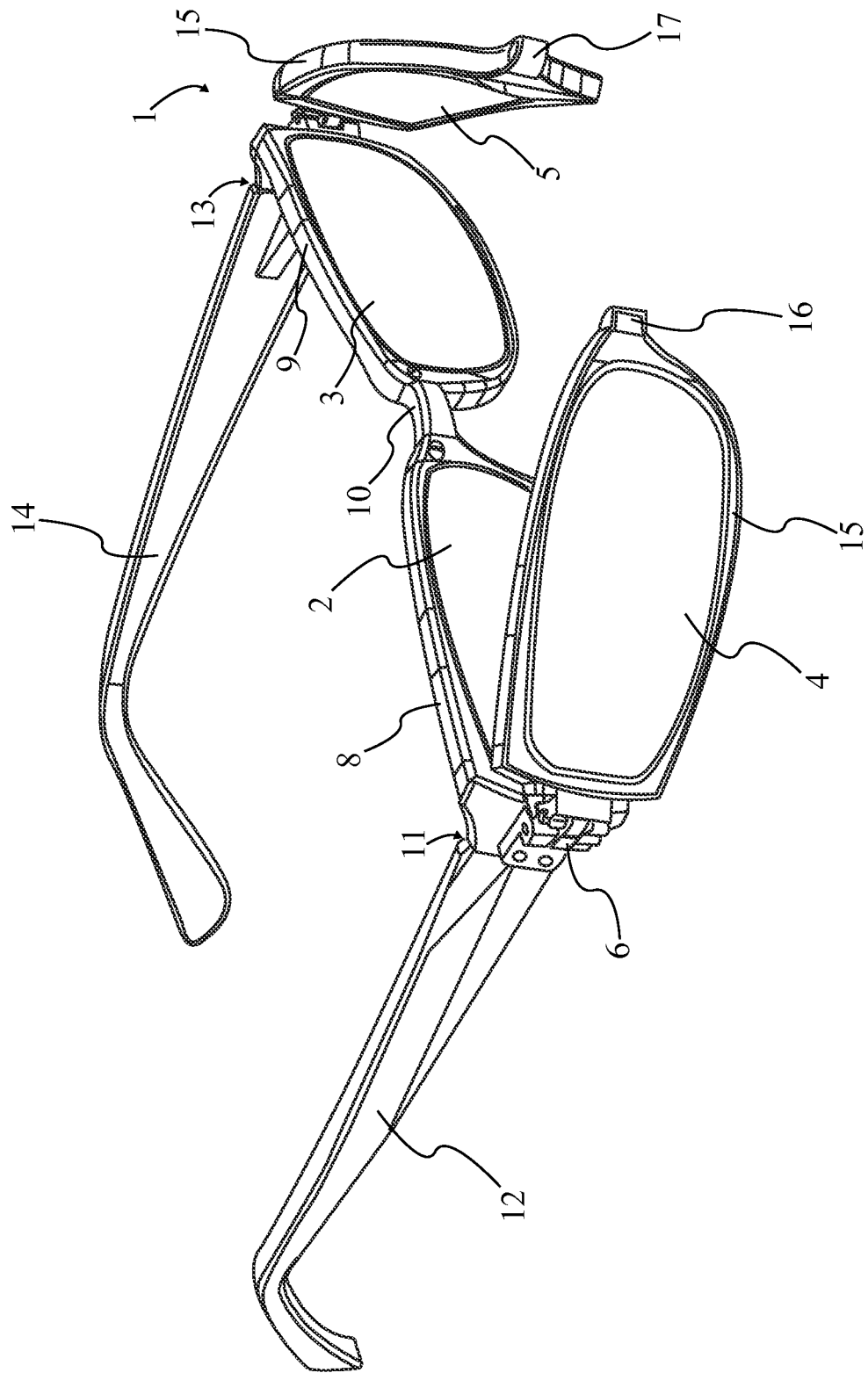
FIG. 3 is a perspective view of a second embodiment of the present invention in an active configuration.

All illustrations of the drawings are for the purpose of describing selected versions of the present invention and are not intended to limit the scope of the present invention.

The present invention is a construction for eyeglasses that provides the means for combining multiple lenses to create desired effects via secondary lenses, such as adaptable focal lengths, shade protection (e.g. allowing regular prescription glasses to also act as sunglasses), style (e.g. providing a different color of lenses), and other combinations that are desirable to consumers. To provide the desired functionality, the present invention comprises a frame 1, a first fixed lens 2, a second fixed lens 3, a first selectable lens 4, a second selectable lens 5, a first double-knuckle hinge 6, and a second double-knuckle hinge 7. The first fixed lens 2 and the second fixed lens 3 are held in fixed positions, secured to the frame 1. The first selectable lens 4 and second selectable lens 5 are pivotally connected to the frame 1 by the first double-knuckle hinge 6 and the second double-knuckle hinge 7. The double-knuckle hinges allow the corresponding selectable lenses to be switched between a storage configuration and an active configuration. The present invention is illustrated (with two variant designs) via FIG. 1-FIG. 4.

The frame 1 itself comprises a first rim 8, a second rim 9, a bridge 10, a first temple hinge 11, a first temple arm 12, a second temple hinge 13, and a second temple arm 14. The frame 1 serves to support both the fixed lenses and the selectable lenses, in addition to allowing the present invention to be worn by a person. The first rim 8 and the second rim 9 are provided to secure the first fixed lens 2 and the second fixed lens 3 in place; the first fixed lens 2 is perimetrically connected interior to the first rim 8, while the second fixed lens 3 is perimetrically connected interior to the second rim 9. The result is that each lens is essentially framed by its respective rim, similar to relation between a picture and a picture frame. Joining the first rim 8 and the second rim 9 to each other is the bridge 10, which is positioned between the two rims. The bridge 10 acts as a connecting piece, with the resultant combination of the bridge 10 and rims being a single rigid member. The first temple arm 12 and the second temple arm 14 allow the present invention to be supported by a person's ear. The first temple arm 12 and the second temple arm 14 are hingedly connected to the main body of the frame 1 by the corresponding first temple hinge 11 and the second temple hinge 13. This allows the first temple arm 12 and the second temple arm 14 to be folded towards the frame 1 when not in use, creating a more compact profile that is easier to store and transport. More specifically stated, the first temple hinge 11 adjacently connects the first temple arm 12 to the first rim 8 and the second temple hinge 13 adjacently connects the second temple arm 14 to the second rim 9.

The frame 1 components explained in the previous paragraph are related to standard constructions of glasses, forming the basis for the unique adaptation offered by the present invention. Different base constructions (for example with fixed temple arms or even rimless glasses) could potentially be utilized without affecting the unique aspects of the present invention as subsequently detailed.

Figure 5:
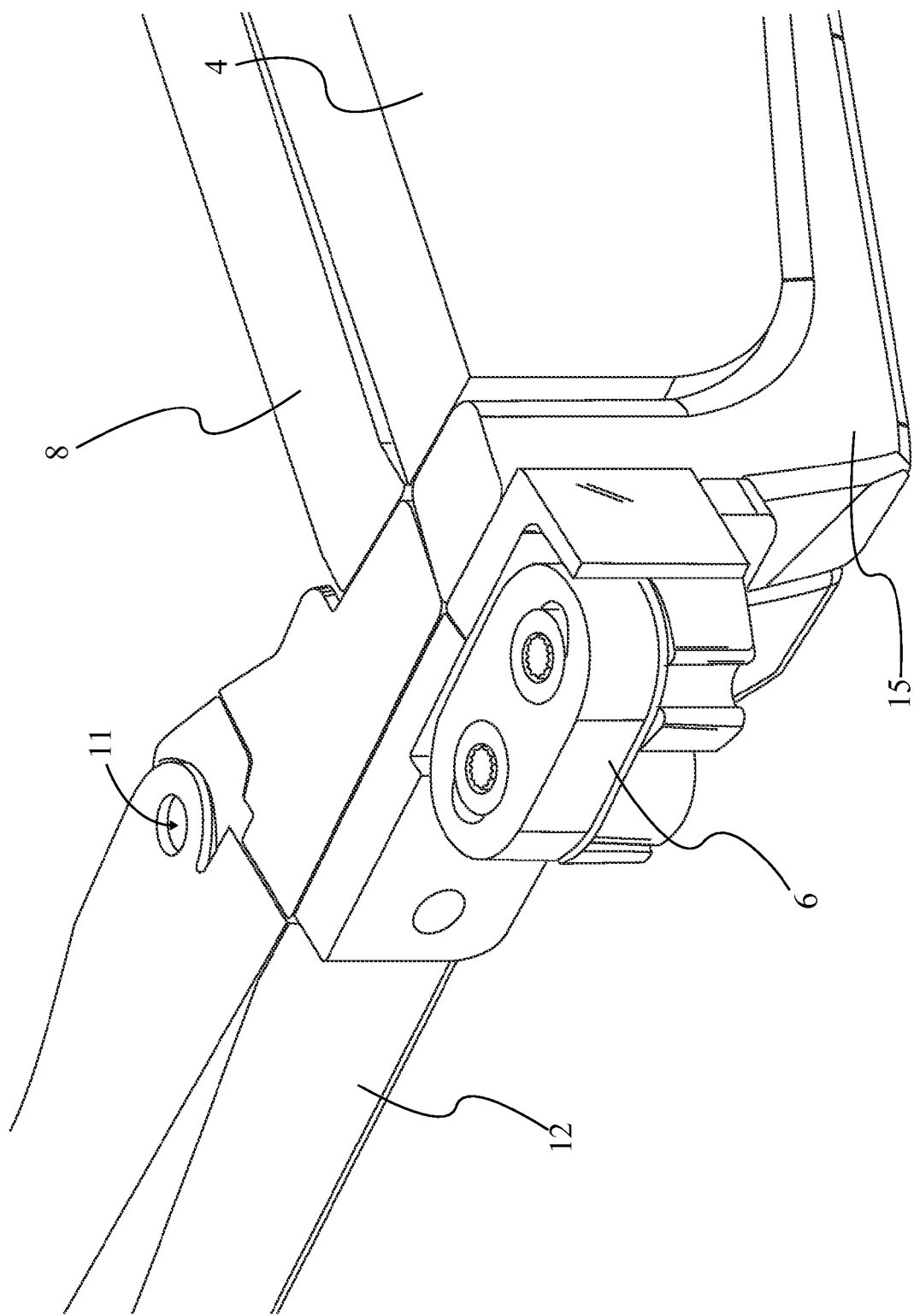
FIG. 5 is a perspective view showing a double-knuckle hinge of the present invention.
Figure 6:
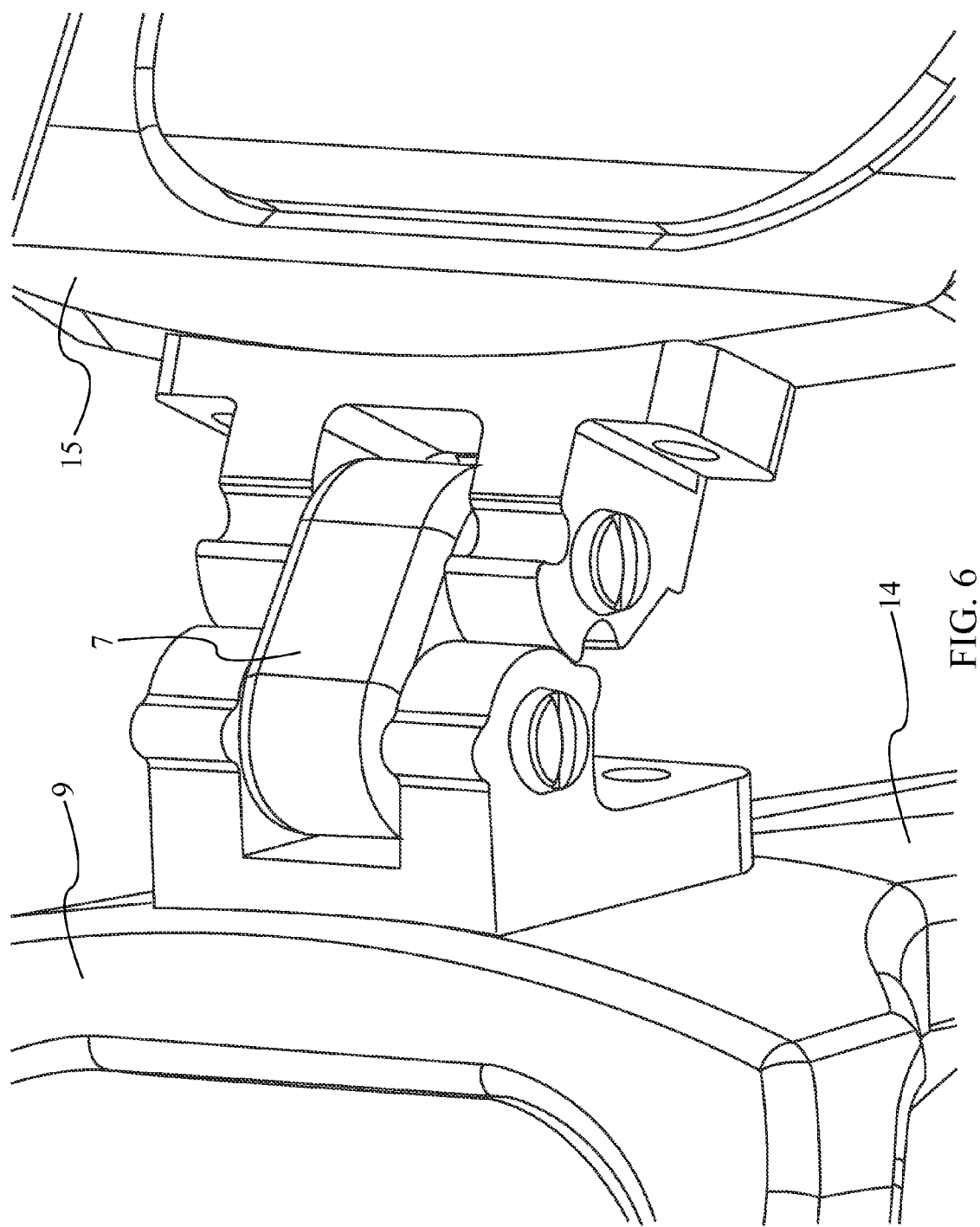
FIG. 6 is another perspective view showing a double-knuckle hinge of the present invention.
Figure 7:
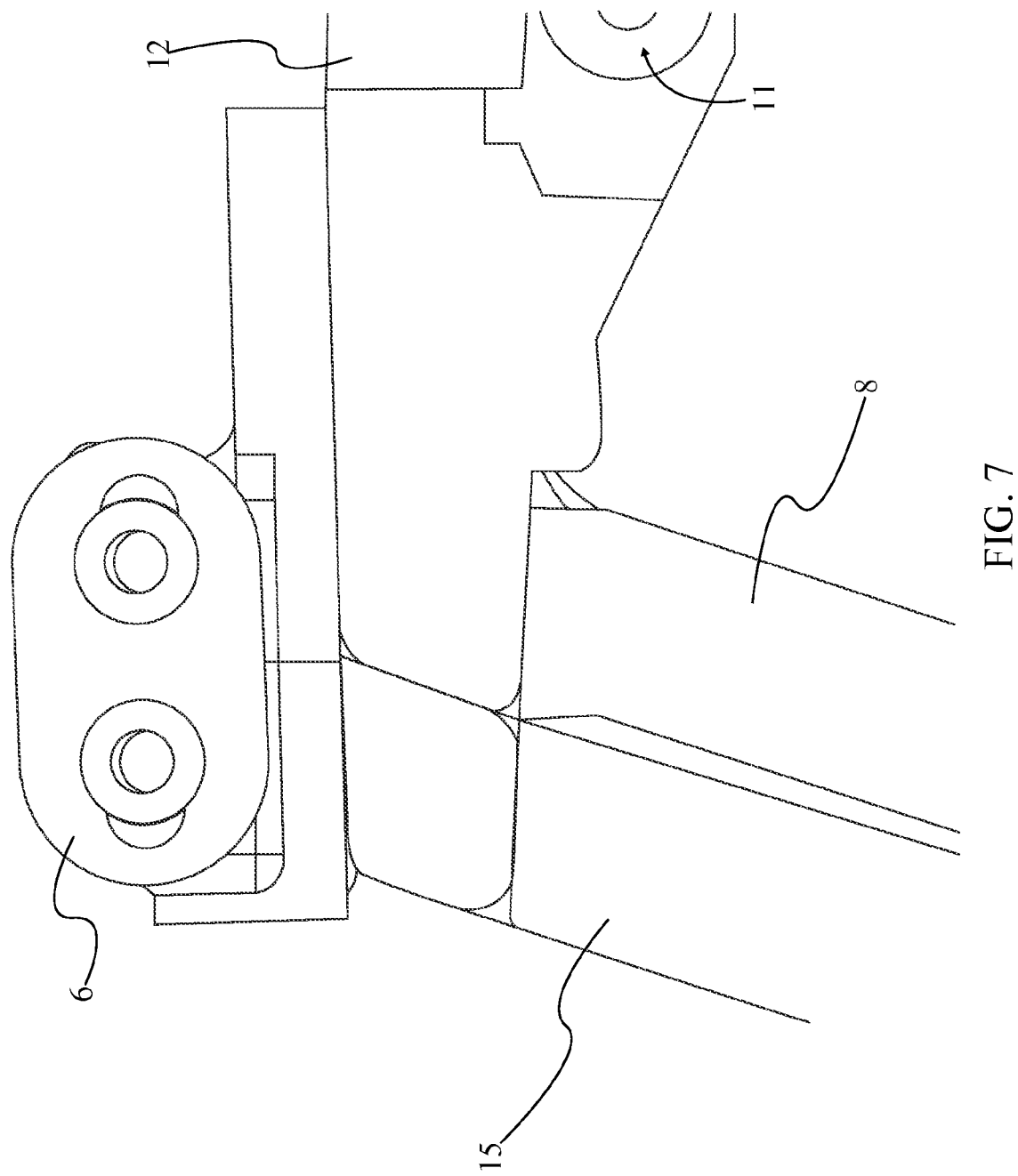
FIG. 7 is a top view showing a double-knuckle hinge of the present invention.
Figure 9:
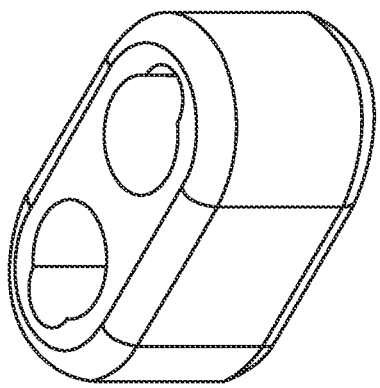
FIG. 9 is perspective view thereof.
Figure 11:
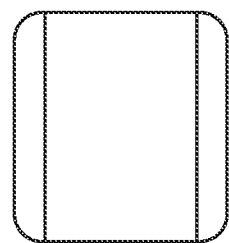
FIG. 11 is right-side elevational view thereof.
Figure 8:
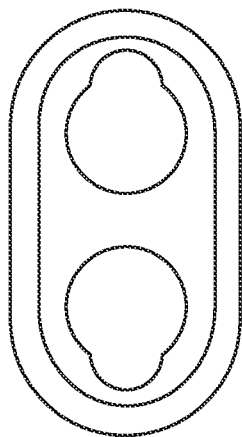
FIG. 8 is a top plan view showing a connecting member of a double-knuckle hinge of the present invention.
Figure 10:
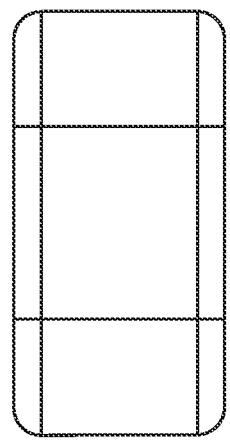
FIG. 10 is a front elevational view thereof.
Figure 15:
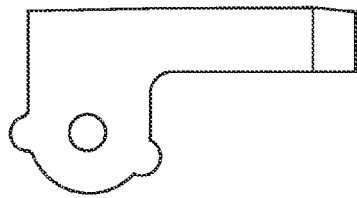
FIG. 15 is a right-side elevational view thereof.
Figure 14:
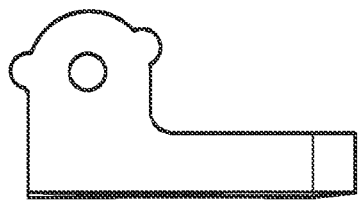
FIG. 14 is a left-side elevational view thereof.
Figure 13:
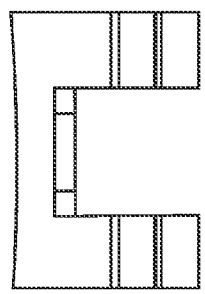
FIG. 13 is a top plan view thereof.
Figure 17:
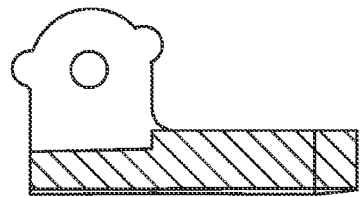
FIG. 17 is a left-side elevational view thereof taken along line A-A of FIG. 16.
Figure 12:
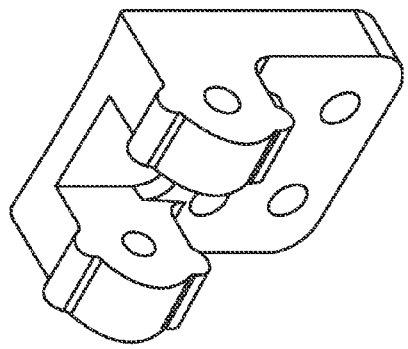
FIG. 12 is a perspective view showing a first mounting arm of a double-knuckle hinge of the present invention.
Figure 16:
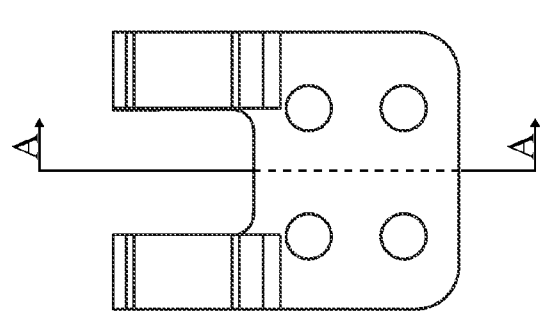
FIG. 16 is a front elevational view thereof, showing the plane upon which a cross-sectional view is taken and shown in FIG. 17.
Figure 20:
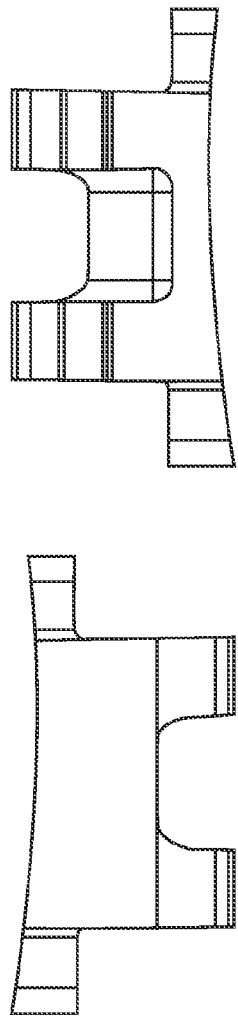
FIG. 20 is a bottom plan view thereof.
Figure 19:
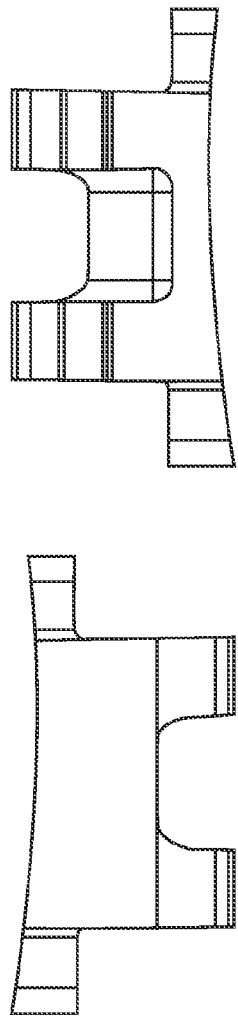
FIG. 19 is a top plan view thereof.
Figure 22:
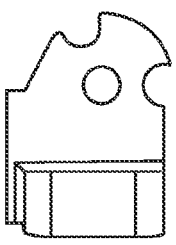
FIG. 22 is a right-side elevational view thereof.
Figure 24:
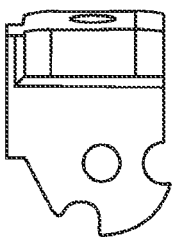
FIG. 24 is a right-side elevational view thereof taken along line A-A of FIG. 23.
Figure 21:
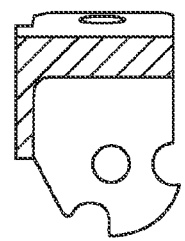
FIG. 21 is a left-side elevational view thereof.
Figure 18:
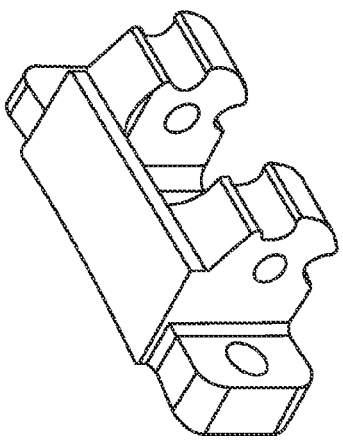
FIG. 18 is a perspective view showing a second mounting arm of a double-knuckle hinge of the present invention.
Figure 23:
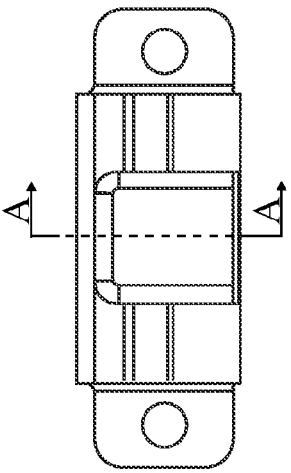
FIG. 23 is a front elevational view thereof, showing the plane upon which a cross-sectional view is taken and shown in FIG. 14.
Figure 25:
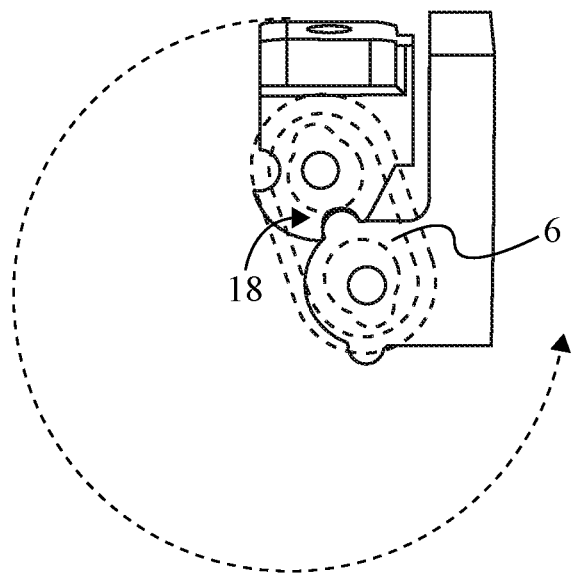
FIG. 25-28 show a first passive lock is integrated into the first double-knuckle hinge while a second passive lock is integrated into the second double-knuckle hinge.
Figure 26:
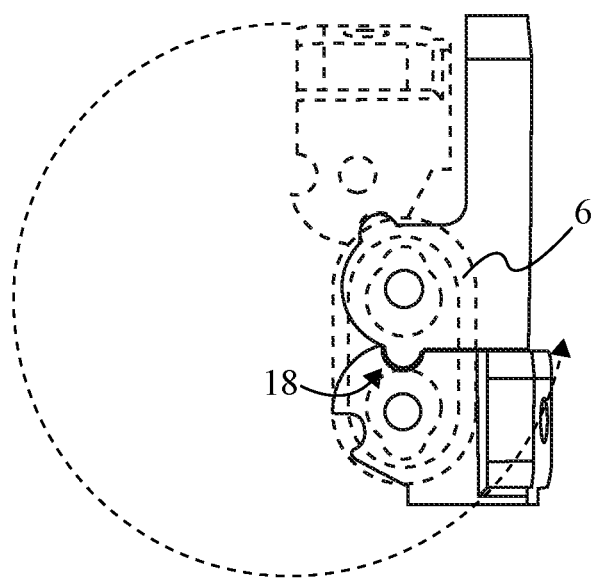
Figure 27:
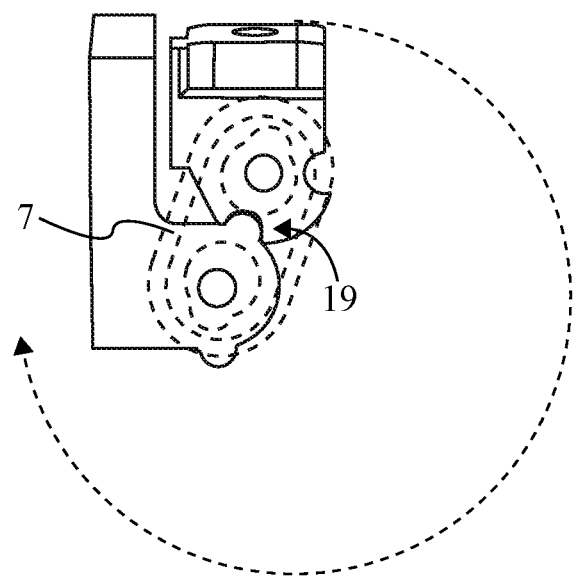
Figure 28:
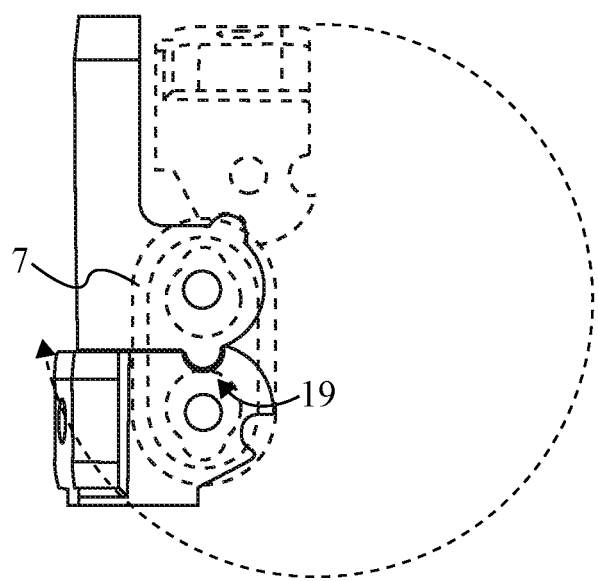

The first selectable lens 4 and the second selectable lens 5 can be switched between a storage configuration and an active configuration, allowing a user to change the focal length (i.e. "prescription") of the fixed lenses, color, ultraviolet ray permeability, or variety of other potential features and qualities. The first selectable lens 4 and second selectable lens 5 are able to switch between configurations by means of the first double-knuckle hinge 6 and the second double-knuckle hinge 7. These double-knuckled hinges allow for 270 degrees of rotation; thus the selectable lens may be aligned with their corresponding temple arms (i.e. the "storage" configuration) or rotated to overlap the corresponding primary lenses (i.e. the "active" configuration). The double-knuckle hinges are shown in expanded views view FIG. 5-FIG. 7. A potential construction for the double-knuckle hinges is shown via FIG. 8-FIG. 24.

The storage configuration is utilized when the selectable lenses are not needed. In this configuration the selectable lenses are folded back where they tuck into the temple arms, resting adjacent to the user's head. This positioning keeps the selectable lenses in an unobtrusive and ergonomic state while not in use. In an embodiment where a corresponding rim 15 is provided for each the selectable lenses, the corresponding rim 15 can be made flush with a recessed portion of an adjacent temple arm, improving the aesthetic qualities of the present invention. Thus, in embodiments that comprise such, the corresponding rim 15 of each selectable lens is aligned with the adjacent temple arm resulting in a slim profile along either side of a wearer's head. The corresponding rim 15, if utilized, frames the associated lens just as the first fixed lens 2 is framed by the first rim 8 and the second fixed lens 3 is framed by the second rim 9.

Figure 4:
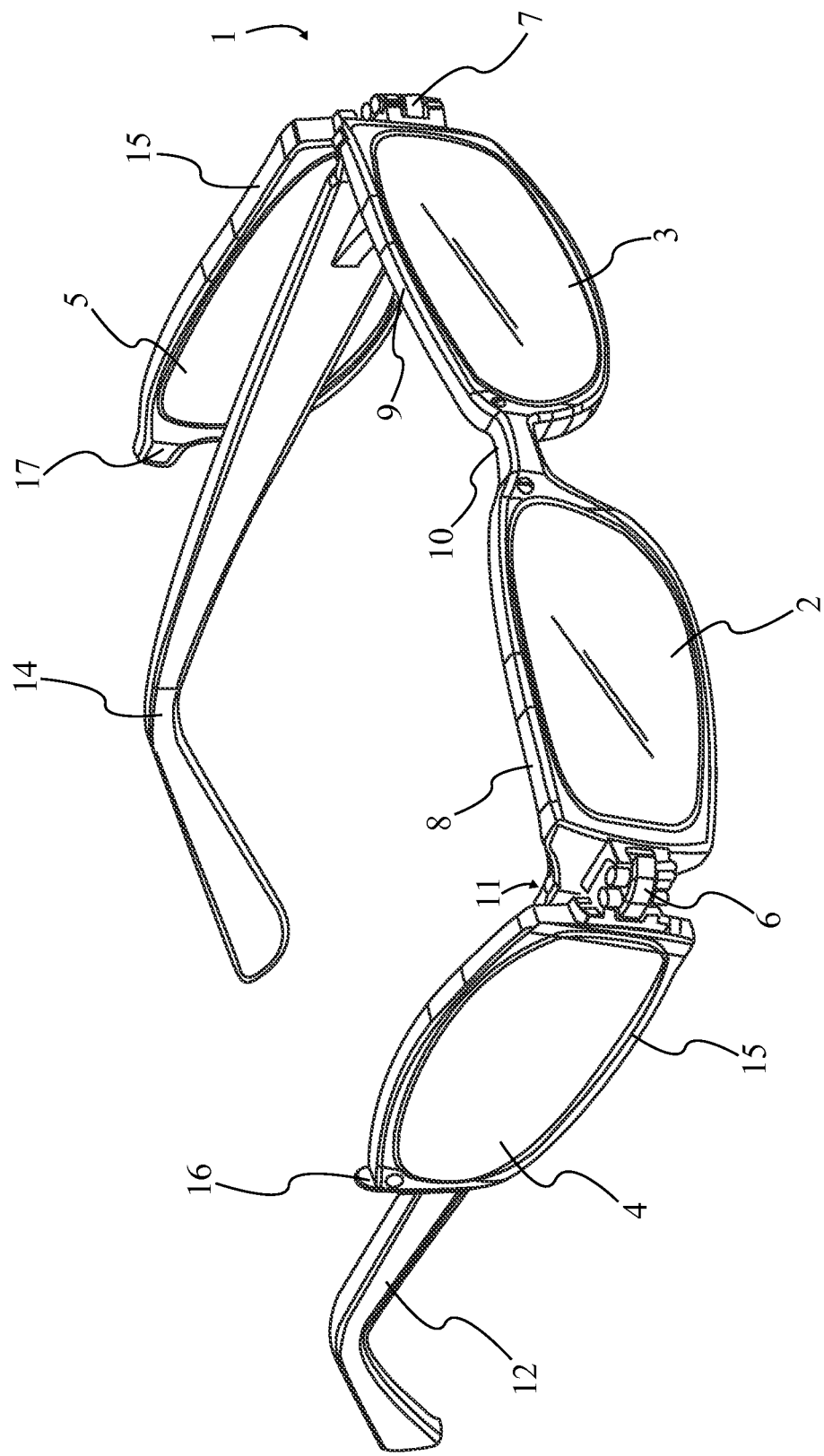
FIG. 4 is a perspective view of a second embodiment of the present invention in a storage configuration.

Similarly, the corresponding rims 15 fit into matching receiving cavities which are positioned along the first rim 8 (of the first fixed lens 2) and second rim 9 (of the second fixed lens 3). As with the storage configuration, the corresponding rims 15 help to make the active configuration more aesthetically pleasing, maintaining an ideal and smaller profile compared to embodiments that do not utilize corresponding rims 15 and receiving cavities. In an embodiment without receiving cavities, the selectable lenses may simply be folded to rest against their respective temple arms (as seen in FIG. 4), rather than latching into a matching receptacle.

To help a user manipulate the selectable lenses, a first tab 16 is connected to the first selectable lens 4 and a second tab 17 is connected to the second selectable lens 5. These tabs, positioned adjacent to the perimeter of the corresponding selectable lens, allow a person to switch the selectable lenses between storage and active configurations without directly touching the lenses. This is advantageous as fingers can often leave smudges or dirt, affecting the clarity of the lenses and thus requiring a user to more frequently wipe down the lenses.

Potentially, passive locking mechanisms can be provided in order to secure the selectable lenses in either the storage configuration or active configuration. Such an addition is desirable as it would prevent shifting of the selectable lenses during normal everyday use, which would prove to be a hindrance to a user. A first passive lock 18 is integrated into the first double-knuckle hinge 6 while a second passive lock 19 is integrated into the second double-knuckle hinge 7. The passive lock can be based off a number of operating principles and mechanisms, with the focal point being the passive nature. The passive nature of the locks is important as it makes the invention simpler to use; while active locks could be used the required user manipulating would degrade from the overall experience of the present invention. One example of a passive lock is a friction pad that inhibits rotation of the hinges; such locks create enough friction that everyday activities will not cause unintended movement of the hinges, while still allowing a user to intentionally apply pressure to rotate the hinges. Another potential example is a spring loaded tab; the tab can prevent rotation of the hinge due to normal forces, while the addition of bezels on either edge of the tab will allow a user to forcibly rotate the hinge with a sufficient amount of force. Further examples include the use of magnetic materials (positioned along the temple arms) and magnetic strips (positioned on the corresponding rims 15), snap fasteners, magnetic blocks, and latches. This is a non-exhaustive list of potential locking mechanisms and are not meant to limit the use of other passive lock implementations. Furthermore, though passive locks are preferable, active locks can be used without negatively impacting the primary components, configuration, and function of the present invention.

As earlier referenced, the fixed lenses and the selectable lenses may be made from a variety of materials and designs with properties which are desirable to combine. For example, the fixed lenses may be convergent lenses (i.e. improving nearsightedness) while the selectable lenses can be divergent lenses (i.e. improving farsightedness). The combination of convergent and divergent lenses allows the present invention to effectively substitute for bifocals without the corresponding drawbacks. In other embodiments the fixed lenses could be used to correct vision (whether nearsighted or farsighted) while the selectable lenses can provide the ability of sunglasses (i.e. being polarized), colored (e.g. for fashionable purposes), or otherwise decorated in a number of manners. Ultimately, any number of combinations of lens functions may be implemented while remaining within the scope of the present invention.

Although the invention has been explained in relation to its preferred embodiment, it is to be understood that many other possible modifications and variations can be made without departing from the spirit and scope of the invention as hereinafter claimed.

What is claimed is:

1. A pair of glasses with secondary lenses comprises:
a frame;
a first fixed lens;
a second fixed lens;
a first selectable lens;
a second selectable lens;
a first double-knuckle hinge;
a second double-knuckle hinge;
the frame comprises a first rim, a second rim, a bridge, first temple hinge, a first temple arm, a second temple hinge, and a second temple arm;
the first rim being connected to the second rim by the bridge;
the first fixed lens being framed by the first rim;
the second fixed lens being framed by the second rim;
the first selectable lens being positioned adjacent to the first rim, wherein the first rim comprises a receiving cavity configured to receive a rim of the first selectable lens;
the second selectable lens being positioned adjacent to the second rim, wherein the second rim comprises a receiving cavity configured to receive a rim of the second selectable lens;
the first double-knuckle hinge being connected between the first selectable lens and the first rim; and
the second double-knuckle hinge being connected between the second selectable lens and the second rim.

2. The pair of glasses with secondary lenses as claimed in claim 1 comprises:
the first temple hinge being connected between the first temple arm and the first rim; and
the second temple hinge being connected between the second temple arm and the second rim.

3. The pair of glasses with secondary lenses as claimed in claim 1 comprises:
the first selectable lens being positioned adjacent to the first temple arm, wherein the first selectable lens is in a stored position; and
the second selectable lens being positioned adjacent to the second temple arm, wherein the second selectable lens is in a stored position.

4. The pair of glasses with secondary lenses as claimed in claim 1 comprises:
the first selectable lens being positioned adjacent to the first rim;
the second selectable lens being positioned adjacent to the second rim;
the first selectable lens being centrally aligned with the first fixed lens;
the first selectable lens overlapping the first fixed lens;
the second selectable lens being centrally aligned with the second fixed lens; and
the second selectable lens overlapping the second fixed lens.

5. The pair of glasses with secondary lenses as claimed in claim 1 comprises:
the first selectable lens and the second selectable lens each being framed by a corresponding rim;
the corresponding rim of the first selectable lens being flush with the first temple arm; and
the corresponding rim of the second selectable lens being flush with the second temple arm.

6. The pair of glasses with secondary lenses as claimed in claim 1 comprises:
a first tab;
a second tab;
the first tab being adjacently connected to the first selectable lens, wherein the first tab allows the first selectable lens to be rotated about the first double-knuckle hinge without directly touching the first selectable lens; and
the second tab being adjacently connected to the second selectable lens, wherein the second tab allows the second selectable lens to be rotated about the second double-knuckle hinge without directly touching the second selectable lens.

7. The pair of glasses with secondary lenses as claimed in claim 1 comprises:
a first passive lock;
a second passive lock;
the first passive lock being integrated into the first double-knuckle hinge, wherein the first passive lock prevents pivoting of the first double-knuckle hinge; and
the second passive lock being integrated into the second double-knuckle hinge, wherein the second passive lock prevents pivoting of the second double-knuckle hinge.

8. A pair of glasses with secondary lenses comprises:
a frame;
a first fixed lens;
a second fixed lens;
a first selectable lens;
a second selectable lens;
a first double-knuckle hinge;
a second double-knuckle hinge;
a first passive lock;
a second passive lock;
the frame comprises a first rim, a second rim, a bridge, first temple hinge, a first temple arm, a second temple hinge, and a second temple arm;
the first rim being connected to the second rim by the bridge;
the first fixed lens being framed by the first rim;
the second fixed lens being framed by the second rim;
the first selectable lens being positioned adjacent to the first rim, wherein the first rim comprises a receiving cavity configured to receive a rim of the first selectable lens;
the second selectable lens being positioned adjacent to the second rim, wherein the second rim comprises a receiving cavity configured to receive a rim of the second selectable lens;
the first double-knuckle hinge being connected between the first selectable lens and the first rim;
the second double-knuckle hinge being connected between the second selectable lens and the second rim;
the first passive lock being integrated into the first double-knuckle hinge, wherein the first passive lock prevents pivoting of the first double-knuckle hinge; and the second passive lock being integrated into the second double-knuckle hinge, wherein the second passive lock prevents pivoting of the second double-knuckle hinge.

9. The pair of glasses with secondary lenses as claimed in claim 8 comprises:
the first temple hinge being connected between the first temple arm and the first rim; and
the second temple hinge being connected between the second temple arm and the second rim.

10. The pair of glasses with secondary lenses as claimed in claim 8 comprises:
the first selectable lens being positioned adjacent to the first temple arm, wherein the first selectable lens is in a stored position; and
the second selectable lens being positioned adjacent to the second temple arm, wherein the second selectable lens is in a stored position.

11. The pair of glasses with secondary lenses as claimed in claim 8 comprises:
the first selectable lens being positioned adjacent to the first rim;
the second selectable lens being positioned adjacent to the second rim;
the first selectable lens being centrally aligned with the first fixed lens;
the first selectable lens overlapping the first fixed lens;
the second selectable lens being centrally aligned with the second fixed lens; and
the second selectable lens overlapping the second fixed lens.

12. The pair of glasses with secondary lenses as claimed in claim 8 comprises: the first selectable lens and the second selectable lens each being framed by a corresponding rim; the corresponding rim of the first selectable lens being flush with the first temple arm; and the corresponding rim of the second selectable lens being flush with the second temple arm.

13. The pair of glasses with secondary lenses as claimed in claim 8 comprises:
a first tab;
a second tab;
the first tab being adjacently connected to the first selectable lens, wherein the first tab allows the first selectable lens to be rotated about the first double-knuckle hinge without directly touching the first selectable lens; and
the second tab being adjacently connected to the second selectable lens, wherein the second tab allows the second selectable lens to be rotated about the second double-knuckle hinge without directly touching the second selectable lens.

14. A pair of glasses with secondary lenses comprises:
a frame;
a first fixed lens;
a second fixed lens;
a first selectable lens;
a second selectable lens;
a first double-knuckle hinge;
a second double-knuckle hinge;
a first passive lock;
a second passive lock;
the frame comprises a first rim, a second rim, a bridge, first temple hinge, a first temple arm, a second temple hinge, and a second temple arm;
the first rim being connected to the second rim by the bridge;
the first fixed lens being framed by the first rim;
the second fixed lens being framed by the second rim;
the first selectable lens being positioned adjacent to the first rim, wherein the first rim comprises a receiving cavity configured to receive a rim of the first selectable lens;
the second selectable lens being positioned adjacent to the second rim, wherein the second rim comprises a receiving cavity configured to receive a rim of the second selectable lens;
the first temple hinge being connected between the first temple arm and the first rim;
the second temple hinge being connected between the second temple arm and the second rim;
the first double-knuckle hinge being connected between the first selectable lens and the first rim;
the second double-knuckle hinge being connected between the second selectable lens and the second rim;
the first passive lock being integrated into the first double-knuckle hinge, wherein the first passive lock prevents pivoting of the first double-knuckle hinge; and
the second passive lock being integrated into the second double-knuckle hinge, wherein the second passive lock prevents pivoting of the second double-knuckle hinge.

15. The pair of glasses with secondary lenses as claimed in claim 14 comprises:
the first selectable lens being positioned adjacent to the first temple arm, wherein the first selectable lens is in a stored position; and
the second selectable lens being positioned adjacent to the second temple arm, wherein the second selectable lens is in a stored position.

16. The pair of glasses with secondary lenses as claimed in claim 14 comprises:
the first selectable lens being positioned adjacent to the first rim;
the second selectable lens being positioned adjacent to the second rim;
the first selectable lens being centrally aligned with the first fixed lens;
the first selectable lens overlapping the first fixed lens;
the second selectable lens being centrally aligned with the second fixed lens; and
the second selectable lens overlapping the second fixed lens.

17. The pair of glasses with secondary lenses as claimed in claim 14 comprises:
the first selectable lens and the second selectable lens each being framed by a corresponding rim;
the corresponding rim of the first selectable lens being flush with the first temple; and
the corresponding rim of the second selectable lens being flush with the second temple.

18. The pair of glasses with secondary lenses as claimed in claim 14 comprises:
a first tab;
a second tab;
the first tab being adjacently connected to the first selectable lens, wherein the first tab allows the first selectable lens to be rotated about the first double-knuckle hinge without directly touching the first selectable lens; and
the second tab being adjacently connected to the second selectable lens, wherein the second tab allows the second selectable lens to be rotated about the second double-knuckle hinge without directly touching the second selectable lens.

19. A pair of glasses with secondary lenses comprises:
a frame;
a first fixed lens;
a second fixed lens;
a first selectable lens;
a second selectable lens;
a first double-knuckle hinge;
a second double-knuckle hinge;
the frame comprises a first rim, a second rim, a bridge, first temple hinge, a first temple arm, a second temple hinge, and a second temple arm;
the first rim being connected to the second rim by the bridge;
the first fixed lens being framed by the first rim;
the second fixed lens being framed by the second rim;
the first selectable lens being positioned adjacent to the first rim, wherein the first rim comprises a receiving cavity configured to receive a rim of the first selectable lens;
the second selectable lens being positioned adjacent to the second rim, wherein the second rim comprises a receiving cavity configured to receive a rim of the second selectable lens;
the first double-knuckle hinge being connected between the first selectable lens and the first rim;
the second double-knuckle hinge being connected between the second selectable lens and the second rim;
a passive locking mechanism configured to secure each of the first selectable lens and the second selectable lens in at least one of storage configuration and active configuration, wherein the passive locking mechanism comprises a magnetic material.

20. The pair of glasses with secondary lenses as claimed in claim 19, wherein the passive locking mechanism comprises a magnetic material positioned along each of the first temple arm and the second temple arm and a magnetic strip positioned on each of the rim of the first selectable lens and the rim of the second selectable lens.

\* \* \* \* \*